United States Patent [19]

Esser et al.

[11] 3,980,182

[45] Sept. 14, 1976

[54] WORKPIECE HANDLING DEVICE IN AN INTERNAL BROACHING MACHINE

[75] Inventors: Gustav Esser; Eckhard Schröder, both of Solingen, Germany

[73] Assignee: Oswald Forst Maschinenfabrik und Apparatebauanstalt, Solingen, Germany

[22] Filed: Sept. 12, 1974

[21] Appl. No.: 505,499

[30] Foreign Application Priority Data

Sept. 15, 1973 Germany............................ 2346520

[52] U.S. Cl. .............................. 214/1 BB; 198/747
[51] Int. Cl.² ......................................... B65G 59/06
[58] Field of Search................... 214/1 BB; 198/218; 29/568

[56] References Cited
UNITED STATES PATENTS

| | | | |
|---|---|---|---|
| 3,478,419 | 11/1969 | Cupler | 29/568 |
| 3,768,667 | 10/1973 | Paumier | 214/1 BB |

Primary Examiner—Robert G. Sheridan
Assistant Examiner—Ross Weaver
Attorney, Agent, or Firm—Browdy and Neimark

[57] ABSTRACT

A workpiece handling device for a machine tool having at least one work station disposed on the frame of the machine tool, wherein workpieces are held in workpiece holders during machining comprises a transfer means and a feeding means. The transfer means has a plurality of engaging means defining a plurality of positions along a first axis. A feeding means has two rows of engaging means formed in a plurality of columns. The rows are parallel to the first axis and the columns have parallel axis which interest the first axis and the centerline axis of a respective one of the work stations. The transfer means and the feeding means move in an alternating reciprocal manner to transfer the workpieces from a feeding station where workpieces are inserted, through the machine work stations, to a discharge station where the machined workpiece is ejected and back to the feed station in a cyclical manner.

14 Claims, 15 Drawing Figures

WORKPIECE HANDLING DEVICE IN AN INTERNAL BROACHING MACHINE

BACKGROUND OF THE INVENTION

The invention relates to a workpiece handling device in a machine tool, particularly an internal broaching machine, the said handling device comprising a workpiece feed device which is adapted to perform a reciprocating movement and by which one or more workpieces are brought from a workpiece transfer device, adapted to perform a reciprocating movement perpendicularly to the feed device, to one or more machining stations spaced the same distance apart, and thence returned to the transfer device.

A handling device of this kind, which is provided in an internal broaching machine, and which is primarily constructed as a workpiece indexing device, is known from German Offenlegungsschrift No. 1,752,719. In this known feed device, workpieces are fed one after the other to different broaching stations after indexing by a determined angle in each case.

The invention is based on the use of workpiece holders, in which the workpieces themselves are held, for the purpose of fixing a determined spatial position of the workpiece. The use of workpiece holders of this kind is already known in various fields of technology, although not in the field of broaching, in which fields workpieces are held in the workpiece holders and are fed one after the other to various machining stations; the workpiece itself does not have to be set up anew each time and does not change its position relative to the workpiece holder, so that only the latter has to be adjusted, which is very much simpler.

When workpiece holders of this kind are used the problem arises of bringing the workpiece holders back each time to the starting point, where they are filled with a further workpiece to be machined.

The problem underlying the invention therefore resides in so developing a feed device of the kind first described above that without any noteworthy additional expense for construction and without additional working steps the workpiece holders are automatically brought back to the starting point after the machining of the workpieces contained in them, and are there loaded with further workpieces to be machined.

According to the invention this problem is solved by providing in the feed device two pairs of drivers for each individual machining station, these drivers lying in each case against two surfaces of workpiece holders holding the workpieces, which surfaces lie opposite one another and perpendicularly to the direction of movement of the feed device; that the center-to-center distance of the transfer device from the machining station or stations is equal to the center-to-center distance of the pairs of drivers of the feed device. Pairs of drivers are disposed in the transfer device which are spaced apart to correspond to the machining stations and the number of which is at least one greater than but at most twice as great as the number of machining stations, and which bear in each case against two workpiece holder surfaces lying opposite one another and parallel to the direction of movement of the feed device.

These measures ensure that the workpiece holders rotate in a closed cycle and that in each case they can be loaded with unmachined workpieces before they move to the machining station that is to say particularly a broaching station, while after the machining they can be freed of the machined workpieces. No additional expense for control or drive means is necessary, since the feed device and the transfer device only move in each case to-and-fro between two end positions. A preferred field of application comprises vertical internal broaching machines. The device is used for example for broaching profiled bushes such as are used in industry for connecting shafts the lengths of which are variable. In principle the measures of the invention may however also be applied to other machine tools, such as for example honing machines, drilling and thread cutting machines, milling machines, and the like, in which either a workpiece is subjected in succession to a number of machining operations at different machining stations lying one behind the other, or, because of a very irregular shape of the workpiece, a workpiece holder adapted to this irregular shape is necessary for its machining. In addition, the invention may be applied to processing machines, for example in the packing field, when for example a container (for example a plastic bag) contained in a holder is filled, closed, and marked in a plurality of stations and thereupon the empty holder has to be returned to its starting position.

If it is not necessary for the cross section of the workpiece which is to be machined to be in a determined position in relation to the outer contour of the workpiece, the workpiece holders can in principle be given any external shape. If on the other hand the internal profile of the surfaces of the workpiece which are to be machined have a clearly defined position in relation to the external contour of the workpiece, guide surfaces must be provided in the workpiece holder. These guide surfaces may for example be in the form of grooves in the peripheral wall or end of the workpiece holders. It is however expedient for the surfaces of the workpiece holder which lie opposite one another to be in each case on the form of parallel surfaces, that is to say for the workpiece holder to have approximately the shape of a right parallelpiped.

It is advantageous for the transfer device to be in the form of a plate-shaped sliding element which on its surface carries the workpiece holders and which is provided with upwardly projecting drivers. In this case the workpiece holders, with or without workpieces, stand on this sliding element and are moved by it parallel to the plane of the machining stations and at right angles to the direction of movement of the transfer device.

In addition, it is advantageous for the feed device to be in the form of a carriage disposed above the transfer device and provided with downwardly projecting drivers. In this case there must naturally be a sufficient distance between the sliding elements in the carriage, in order to leave room for the workpiece holders between them. In principle it would also be possible for the sliding element of the transfer device to be disposed at the top and the carriage of the feed device at the bottom; this would however entail the disadvantage that the carriage carrying the workpiece holders together with the workpiece would have to transmit the broaching forces to the machine bed during the broaching operation.

Particularly simple movement of the workpiece holders from the sliding element of the transfer device to the machining stations and back, and from the sliding element to a position remote from the machining stations and back again, is achieved if on both sides of the sliding elements there are provided support plates the horizontal surfaces of which are in line with the likewise horizontal surface of the sliding element, the support plate facing the machining station or stations extending as far as the machining station or stations. During the broaching operation the workpiece holders can stand for example on the support plate, which consists of one or more parts and which takes direct the vertical broaching forces. Absolutely accurate lateral positioning of the workpiece holders not situated on the transfer device is ensured if guide bars are provided on the support plate which extend parallel to the direction of movement of the feed device and laterally guide the holders on the operation of the feed device.

The lateral position of the workpiece holders in the direction of movement of the transfer device is thereby fixed, particularly at the machining station, while the exact position on the direction of movement of the feed device is ensured by the drivers mounted on the latter.

It is expedient for the drivers to be in the form of plates, in which case they are narrower than the parallel surfaces of the workpiece holders against which they bear, and the drivers of the transfer device do not overlap vertically the drivers of the feed device. At least one of these measures is necessary in order to make it impossible for the drivers of the transfer device to collide with the drivers of the feed device during the individual movement steps.

BRIEF DESCRIPTION OF THE DRAWING

Further advantages and features of the invention will be seen from the description of examples of embodiment which are illustrated in the drawing, in which.

DETAILED DESCRIPTION

Figure 1:
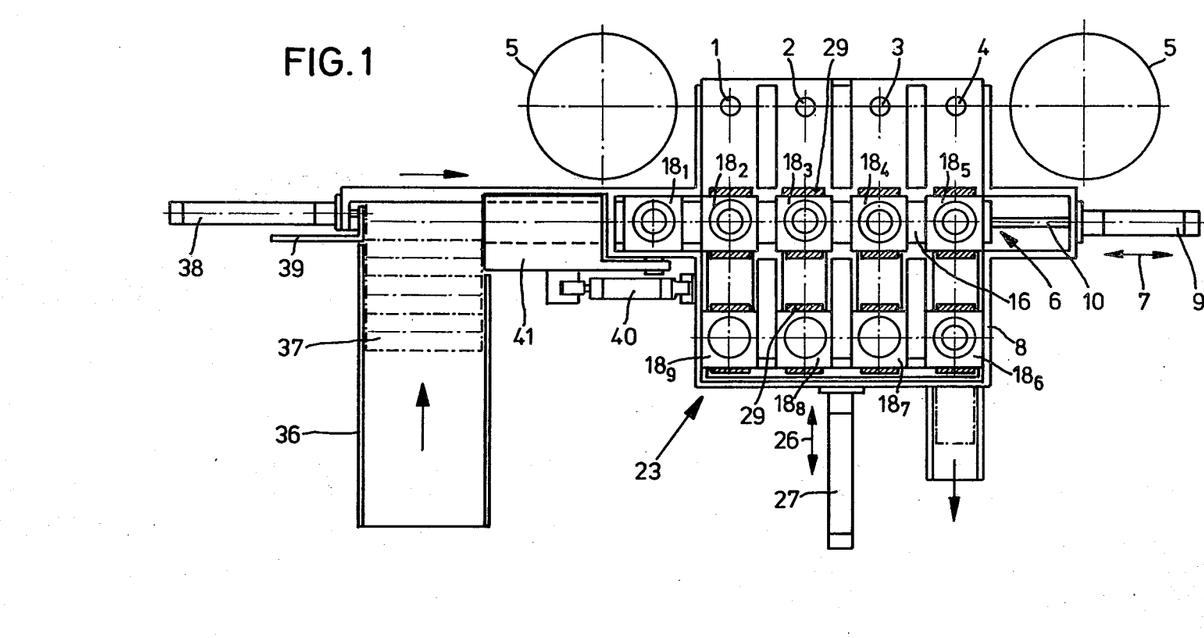
FIG. 1 is a plan view of a handling device on a vertical internal broaching machine, shown diagrammatically.

FIG. 1 shows diagrammatically a plan view of the working plane of a vertical internal broaching machine having four broaching stations 1, 2, 3, 4. The four broaching stations 1 to 4 lie in the usual manner with their vertical axes in one plane, with lateral guide pillars 5 of the broaching tool carriages which are not visible in FIG. 1. The four broaching stations 1 to 4 are spaced the same distance apart. Parallel to the broaching stations 1 to 4 is provided a transfer device 6, which is adapted to be moved to-and-fro in the direction of the arrow 7, the movement corresponding in each case to the distance between two neighboring broaching stations 1 and 2 or 2 and 3 or 3 and 4. For this purpose a hydraulic or pneumatic power cylinder 9 is fastened on the stationary machine frame 8, its piston rod 10 acting on a sliding element 11 which is slidable on two guide rods 12 fastened on the machine frame. On this sliding element is mounted a horizontal slider plate 13 the surface of which is in alignment with the surface of two support plates 14 and 15 disposed one on each side of slider plate 13 of the transfer device 6. The distance between the two support plates 14 and 15 is only slightly greater than the width of the rectangular slider plate 13. On the slider plate 13 are mounted plate-shaped drivers or transfer plates 16 whose vertical contact surfaces 17 lie at right angles to the direction of movement 7 of the transfer device 6. Workpiece holders 18 containing workpieces which are to be broached are held between these contact surfaces.

Figure 2:
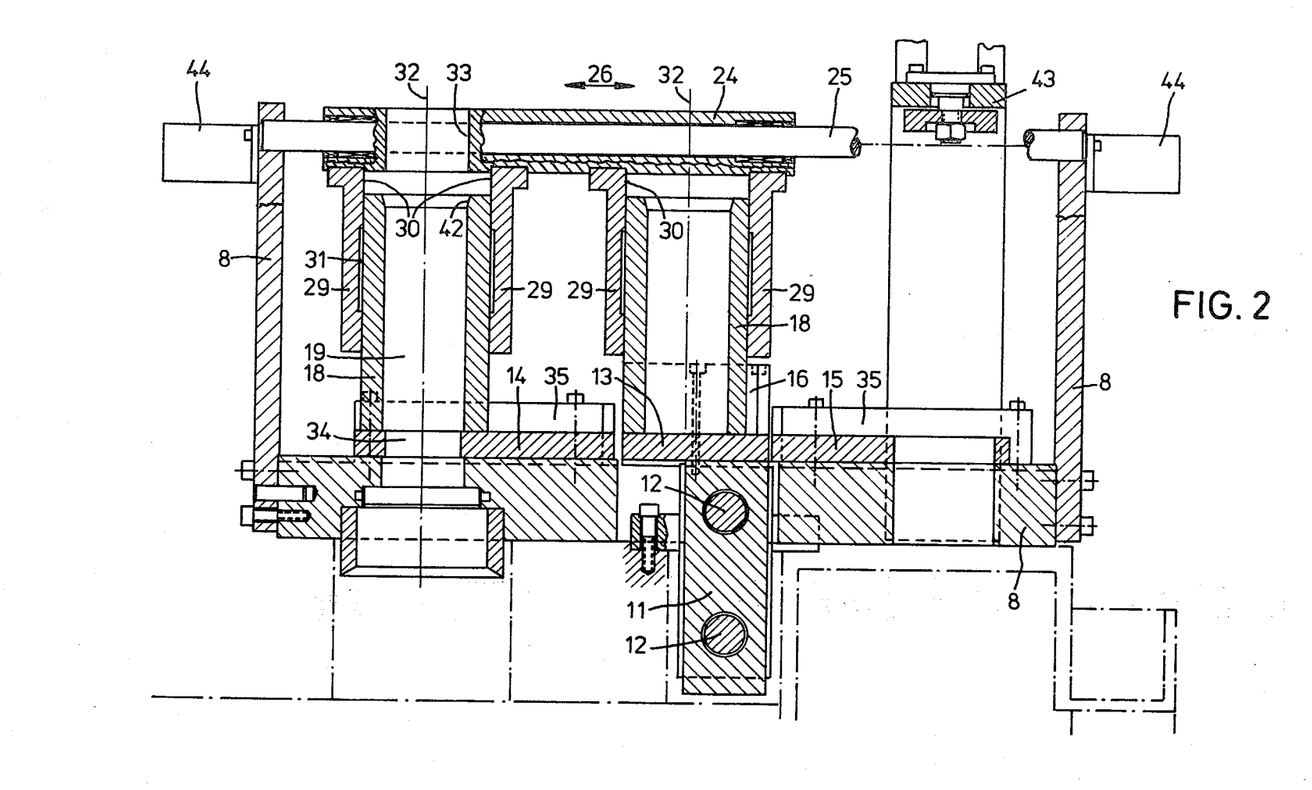
FIG. 2 is a cross sectional side view showing primarily a feed device in the handling device of FIG. 1.
Figures 3, 4:
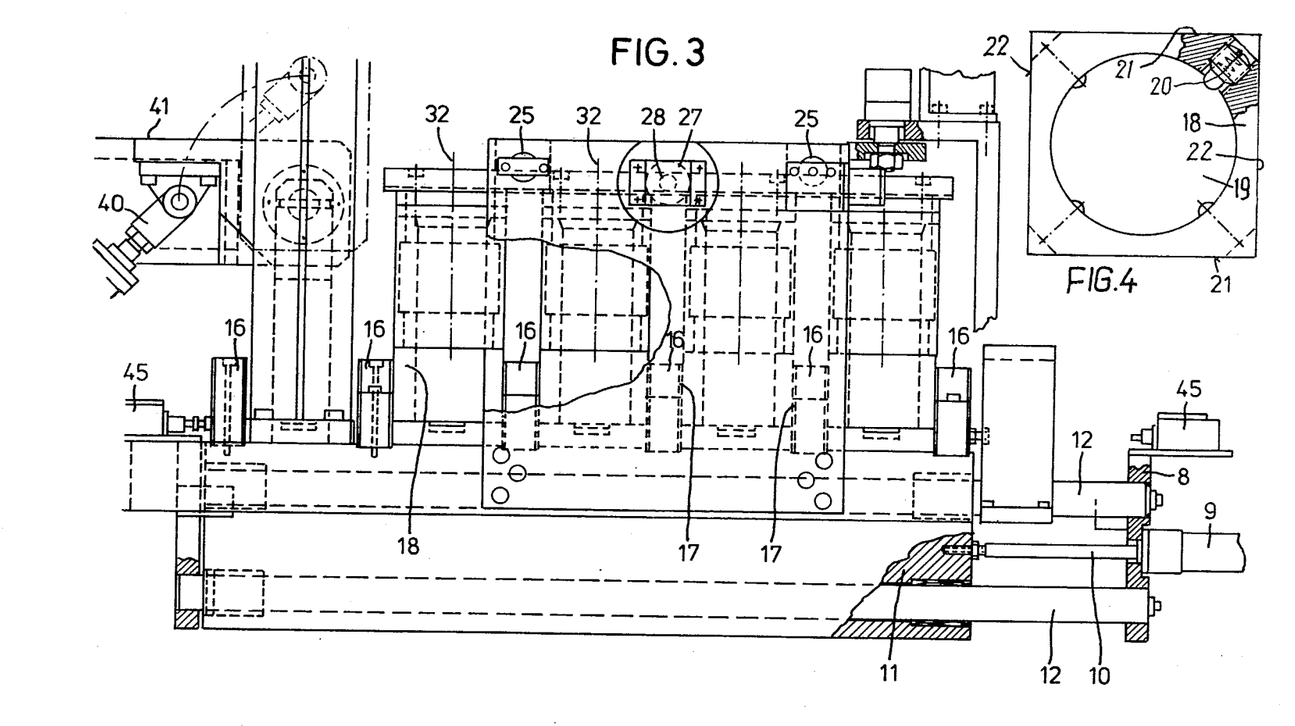
FIG. 3 is a front view of a feed device according to FIGS. 1 and 2.
FIG. 4 is a plan view of a workpiece holder.
Figure 5:
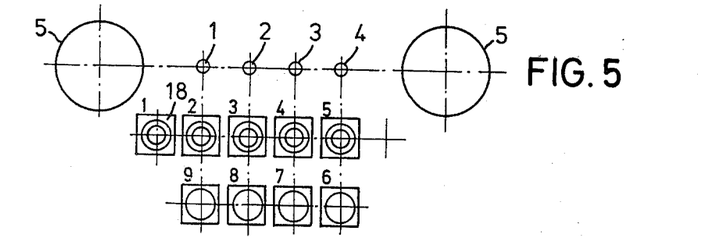
FIGS. 5 to 9 illustrate the individual working steps of a handling device according to FIGS. 1 to 3.

The shape of these workpiece holders 18 can be seen in FIGS. 2 and 4. They have the shape of a right parallelepiped of square or rectangular cross section. Internally they are provided with a cylindrical aperture which, as in the present case, may have a circular cross section. A workpiece which is to be broached, for example a sleeve having an internal toothed profile, is inserted into this aperture 19. The cross section of this aperture 19 is such that a workpiece to be broached fits into it practically without play. In order to prevent rotation, one or more pressure elements 20 bearing resiliently against the workpiece may additionally be provided in the workpiece holder.

It is essential for the workpiece holders 18 that the outer surfaces 21—21 and 22—22 which lie opposite one another, and which are parallel to the axis of the aperture 19, should lie parallel to one another. The drivers 16 are so constructed that the center-to-center distance of workpiece holders 18 which are disposed side by side between the drivers 16 on the slider plate 13 is equal to the distance between the neighboring broaching stations.

Above the transfer device 6 is mounted a feed device 23, which has a plate-shaped carriage 24 which, on guide rods 25 mounted on the machine plate 44, can move towards and away from the broaching stations 1 to 4, at right angle to the direction 7 of movement of the transfer device 6. The direction of movement is also parallel to the plane formed by the surface of the support plates 14 and 15 and of the slider plate 13. Driving in the direction of the arrow 26 is effected by means of a hydraulic or pneumatic power device, the working cylinder 27 of which is fastened on the machine frame 8, while its piston rod 28 is fastened on the carriage 24, parallel to the guide rods 25. On the lower face of this plate-shaped carriage 24 pairs of plate-shaped drivers or driving plates 29 are mounted at such distances from one another that the stop surfaces 30, which face one another and which lie parallel to the direction 7 of movement of the transfer device and extend vertically, can receive practically without clearance a workpiece holder 18 by the parallel surfaces 22—22 or 21—21 of the latter. In order to achieve the most accurate possible guidance of the workpiece holders 18 between the stop surfaces 30, the drivers 29 have undercuts 31 on the stop surfaces 30.

As can be seen particularly in FIG. 2, the distance between the two pairs of drivers 29 associated with each broaching station, and consequently the distance between the axes 32 of two workpiece holders 18 held between the pairs of drivers, is such that when the carriage 24 is moved a distance corresponding to the distance between the two axes 32 a workpiece holder is brought out of its position on the slider plate 13 of the transfer device 6 to the corresponding broaching station 1, 2, 3, or 4, or is brought back from the broaching station to the slider plate. The other workpiece holder 18, which in FIG. 2 is shown in the slider plate 13, is pushed onto the support plate 15 when this return movement is made.

Holes 33, through which a broaching tool can be passed from above, are provided in the carriage 24 above each of the pairs of drivers 29 in the row facing the broaching stations 1 to 4. A hole 34 is also provided concentrically to the axis 32 in the support plate 14 associated with each of the broaching stations 1 to 4 and then the machine frame lying therebeneath, so that the stem of a broaching tool can first be passed from above through the bore 33, through the workpiece contained in the workpiece holder 18, and through the bottom bore 34. This stem is then gripped by a stem holder and pulled downwards through the workpiece. The construction of the actual broaching device may for example be in accordance with Draft German Standard DIN 1415.

On the support plates 14 and 15 are provided lateral guides 35 between which the workpiece holders are secured against displacement transversely to the direction 26 of movement of the feed device 23.

As an extension of the transfer device 6 on one side a feed chute 36 can be provided, by which the workpieces 37, for example sleeves, are fed. By means of a singling slide 39 operated by a hydraulic or pneumatic piston unit 38, one workpiece 37 at a time is pushed, in the direction of the transfer device 6, onto a table 41 which can be pivoted upwards by means of the piston-cylinder unit 40, whereupon the table 41 is pivoted up and the workpiece thus brought onto a workpiece holder $18_1$ situated there. On their top edge the workpiece holders have a bevel 42 serving to facilitate the insertion of the workpieces.

The insertion of the workpiece into the workpiece holder can then be effected by means of a hydraulic push-in slide. In principle the workpieces can also be inserted by hand into the workpiece holders. The transfer device 6 is in this case in is end position facing the workpiece feed system, as shown in FIG. 1. No workpiece holders 18 containing workpieces 37 are situated at the broaching stations 1 to 4. The first row of workpiece holders $18_1$, $18_2$, $18_3$, $18_4$, and $18_5$ facing the broaching stations is situated on the slider plate 13 of the transfer device 6, while the row of workpiece holders $18_6$, $18_7$, $18_8$, and $18_9$ remote from the broaching stations 1 to 4 are situated on the support plate 15, in accordance with the withdrawn position of the carriage 24.

Figure 6:
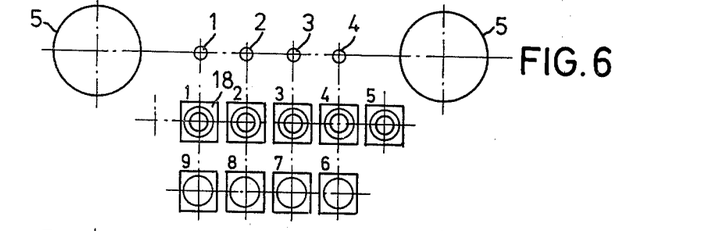

The further transport of the workpiece holders 18 from one broaching station to another and their return transport now proceed in the following manner, for which purpose reference is made to the diagrammatical drawings in FIGS. 5 to 9. The starting position shown in FIG. 5 corresponds to that shown in FIG. 1. By displacement of the transfer device 6 into the right-hand end position (in FIG. 1), the workpiece holder $18_1$ is brought from the feeding station to a position in front of the broaching station 1, while the other workpiece holders, which likewise carry workpieces, are brought in front of the respective neighboring broaching stations 2, 3, and 4, the workpiece holder $18_5$ being pushed out to the right (FIG. 6). The feed device, that is to say the carriage 24, is then pushed forwards, whereby the four workpiece holders $18_1$, $18_2$, $18_3$, $18_4$ lying at the front are pushed down off the slider plate 13 of the transfer device 6 and onto the support plate 14 are pushed to the broaching stations 1 to 4. At the same time the rear row of workpiece holders $18_6$, $18_7$, $18_8$, and $18_9$ are pushed forwards onto the slider plate 13 of the transfer device 6. Since the feed device 23 has only drivers 29 associated with the individual broaching stations, during this movement the workpiece holder $18_5$, which was pulled out to the right in the preceding working step, is not moved (FIG. 7).

Figure 7:
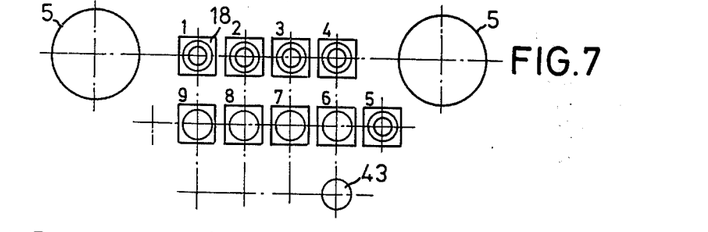

The four workpieces contained in the workpiece holders $18_1$, $18_2$, $18_3$, $18_4$ at the broaching stations 1 to 4, as shown in FIG. 7, are thereupon broached.

Figure 8:
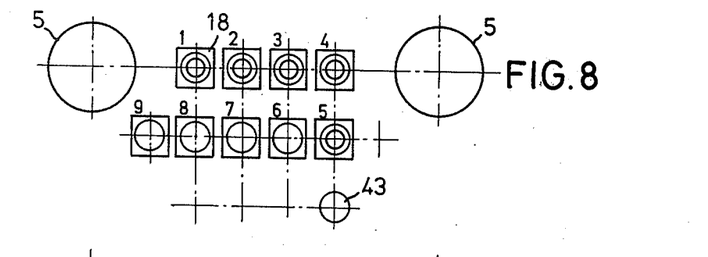

At the same time, or thereafter, the transfer device 6 is brought back to its other end position, that is to say the left-hand position in FIG. 1, so that the workpiece holder $18_9$ comes to the feeding station, where a new workpiece 37 can be inserted in any desired manner into the workpiece holder $18_9$ (FIG. 8).

The feed device is then pulled back to its rear end position, so that all the workpiece holders 18 come back into the position shown in FIG. 1, with the sole difference, that all workpiece holders have advanced one step. In the pull-back position of the feed device 23, a completely broached workpiece 27, produced from the corresponding sleeve can in each case be ejected downwards out of the corresponding workpiece holder, for example by means of a hydraulic ram 43.

Figure 9:
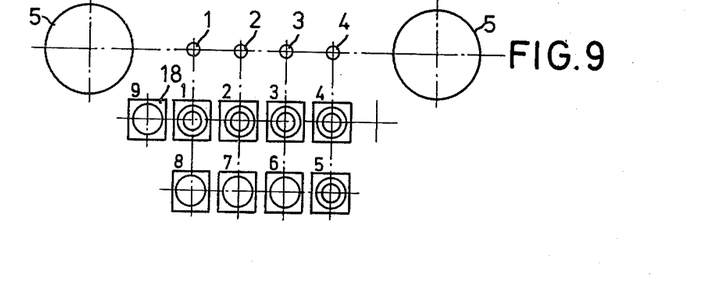
Figure 10:
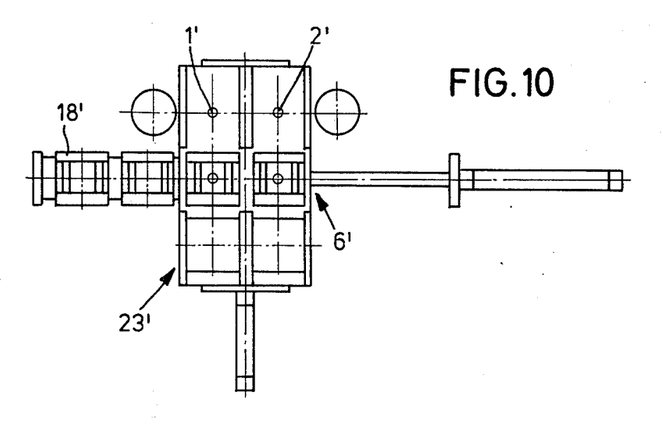
FIG. 10 is a plan view of a handling device in a vertical broaching machine having a plurality of identical broaching stations, shown diagrammatically.
Figure 11:
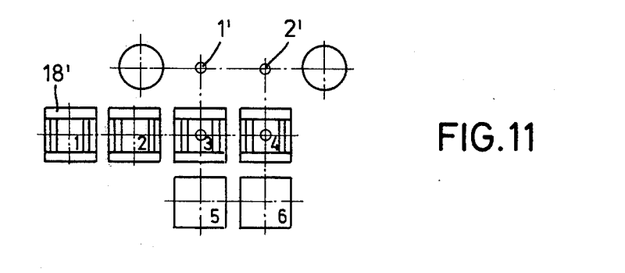
FIGS. 11 to 15 illustrate diagrammatically the individual working steps of the apparatus shown in FIG. 10.

As shown in FIG. 9, the workpiece contained in workpiece holder $18_5$ is ejected by hydraulic ram 43 when workpiece holder $18_5$ is in the position shown in FIG. 9. Repeating the above cycle, the workpiece holders $18_9$, $18_1$, $18_2$, $18_3$, and $18_4$ are moved to the right in FIG. 9 by the transfer device 6 and workpiece holder $18_4$ is then left in the position where FIG. 7 shows workpiece holder 5 when the feeding device 23 moves to place workpiece holder $18_9$ on broaching station 1, workpiece holder $18_1$ on broaching station 2, workpiece holder $18_2$ on broaching station 3, etc. Motion of the transfer device 6 again to the left then places workpiece holder $18_8$ at the feeding station and workpiece holder $18_4$ in a position to be moved into the discharge position as shown by the location of workpiece holder $18_5$ in FIG. 9 upon the return motion of the feeding device 23. Thus each workpiece holder 18 steps through every position from the feeding station through the broaching stations, to the discharge station and back to the feeding station for every nine complete cycles (with nine workpiece holders as shown in FIGS. 5–9) of the machine.

In the system explained in connection with FIGS. 5 to 9, the workpieces pass in succession through all four broaching stations 1 to 4, that is to say each workpiece in succession is subjected to four broaching operations. In order to prevent the workpiece from being pulled axially out of the workpiece holders 18 during the broaching, the hole 34 in the support plate 14 is made smaller than the aperture 19 in the workpiece holders 18. When, as in this example in accordance with FIG. 1 and FIGS. 5 to 9, each workpiece is in succession subjected to a plurality of broaching operations at a plurality of broaching stations, it must in particular be ensured that the workpiece 37 cannot turn in relation to the workpiece holders, and in accordance with FIG. 4 this is achieved by means of the spring pressure elements 20.

Because of the accurately fixed position of the workpiece holders 18 between the drivers 16 of the transfer device 6, or between the drivers 29 of the feed device 23, it is ensured that the workpiece holders 18 are always moved only parallel to their starting position.

Figure 12:
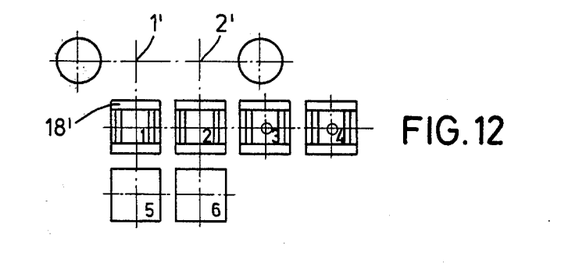
Figure 13:
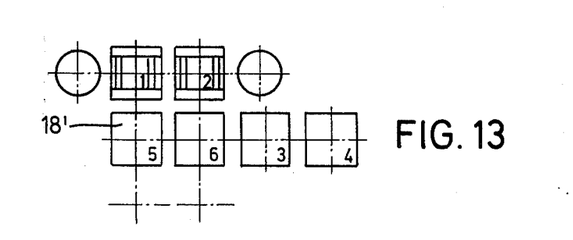
Figure 14:
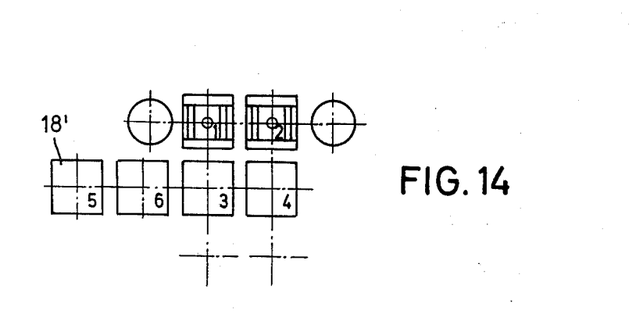
Figure 15:
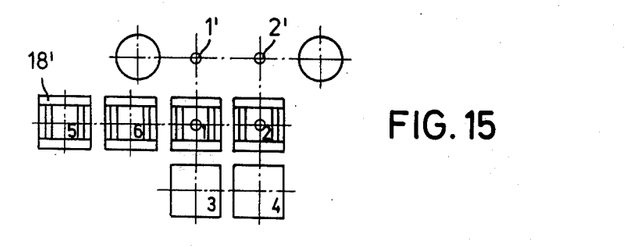

FIGS. 10 to 15 illustrate diagrammatically how the workpiece holders can circulate in accordance with the same principle which has already been described, when each workpiece is subjected to only one broaching operation. In this case a corresponding number of workpieces are in each case subjected simultaneously to the same broaching operation at a plurality of broaching stations 1', 2'. The transfer device 6' can receive twice as many workpiece holders 18' as there are broaching stations. The distance travelled by the transfer device 6' from one end position to the other end position is equal to the distance between two neighboring broaching stations, multiplied by the number of broaching stations. As in the case previously described, the feed device 23' has a number of rows of pairs of drivers corresponding to the number of broaching stations, each row comprising two pairs of drivers disposed one behind the other. The movement of the workpiece holders proceeds as follows in this case. After the workpiece holders $18'_1$ and $18'_2$ shown on the left in FIGS. 10 and 11 have been provided with workpieces, the transfer device is moved to the right-hand end position, travelling twice the distance between the two broaching stations 1' and 2', so that the two holders $18'_1$ and $18'_2$ containing workpieces which have not yet been broached take up positions in front of the two broaching stations 1' and 2' (FIG. 12). Since in this case the feed device 23' is situated in its drawn-back position, the two workpiece holders $18'_3$ and $18'_4$ are therefore on the transfer device, so that they are also moved to the right. The feed device 23' is thereupon pushed forward, so that the two workpiece holders $18'_1$ and $18'_2$, which contain workpieces which have not yet been broached, are moved to the broaching stations 1' and 2', while the workpiece holders $18'_5$ and $18'_6$ which are situated behind them, and from which the broached workpieces have already been taken, are pushed forwards onto the transfer device 6' (FIG. 13). The workpieces contained in the workpiece holders $18'_1$ and $18'_2$ are thereupon broached, and at the same time or thereafter the workpiece transfer device 6' is brought back into its end position, which has already been shown in FIGS. 10 and 11 now placing workpiece holders $18'_5$ and $18'_6$ in the feeding station. The holders $18'_3$ and $18'_4$ containing broached workpieces have previously been freed of broached workpieces in the position shown in FIG. 13, for example in the manner described in connection with the first example embodiment. In the next step of a cycle the feed device 23' is moved back to its rear position, so that the workpiece holders $18'_1$ and $18'_2$ containing broached workpieces are pulled onto the transfer device 6', while the two empty workpiece holders $18'_3$ and $18'_4$ are drawn back. Finally the transfer device 6' is moved to its full right position, and the workpiece holders $18'_1$ and $18'_2$ deposit the broached workpieces. The next work cycle can now commence.

The exact positions of the transfer device 6, 6' in the end positions are ensured by limit switches 45, while in the case of the feed device this function is served by limit switches 44.

It should in addition be pointed out that the drivers 29 situated between two workpiece holders 18 in the feed device 23 (FIG. 2) can naturally also be made in one piece, while conversely in the transfer device 6 the driver 16 situated between two workpiece holders in the transfer device 6 can also be made in two parts.

Finally, it is expedient for the drivers 16 and 29 to be bevelled on their longitudinal side edges facing the workpiece holders, as illustrated in the drawing, in order to facilitate the lateral insertion of a workpiece holder into the pairs of drivers associated with one another.

It will be obvious to those skilled in the art that various changes may be made without departing from the scope of the invention and the invention is not to be considered limited to what is shown in the drawings and described in the specification.

What is claimed is:

1. A workpiece handling device in a machine tool having at least one working station, having a vertical center line axis, disposed on the frame of the machine tool and wherein workpieces are held in workpiece holders during machining, comprising:

transfer means, for transferring workpiece holders along a first axis, having a plurality of first engaging means, each for engaging a workpiece holder, the number of said engaging means exceeding the number of working stations by at least one, said plurality of first engaging means defining a plurality of equidistant positions along said transfer means, said equidistant positions along said transfer means being disposed at a lateral distance from each other equal to the lateral distance between adjacent working stations, when more than one working station is present, said transfer means being reciprocably movable along said first axis;

feeding means for transferring workpiece holders along at least one second axis, the number of second axes being equal to the number of working stations, each second axis intersecting said first axis at one of said equidistant positions and forming right angles therewith, and also intersecting the vertical centerline axis of one of said working stations, said feeding means including a plurality of second engaging means each for engaging a workpiece holder, said plurality of second engaging means including one second engaging means lying on each of said second axes at the intersection with said first axis and another second engaging means at a position displaced a predetermined distance from said intersection, said predetermined distance for each second axis being the same as the perpendicular distance from said first axis to the vertical centerline axis of the working station;

a first reciprocating means for reciprocating said feeding transfer means along said first axis; and a second reciprocating means or reciprocating said feeding means along said second axes, whereby, after loading, the workpiece holders carry the work pieces to each of said at least one working stations and, after unloading, the workpiece holders are returned for reloading solely by means of operation of said transfer means, said feed means and said first and second reciprocating means.

2. A workpiece handling device in accordance with claim 1 wherein each of said plurality of first engaging means includes a pair of transfer plates between which a workpiece may be engaged for transferral, and wherein each of said plurality of second engaging means includes a pair of driving plates between which a workpiece may be engaged for transferral.

3. The workpiece handling device of claim 1 wherein the said transfer means has no more than twice as many engaging means as there are work stations.

4. A workpiece handling device of claim 2 wherein said transfer means further comprises:
   a plate-shaped element slidably mounted on the frame of the machine tool and connected to said first reciprocating means; and wherein
   said plurality of pairs of transfer plates form vertical upward projections on said plate-shaped element.

5. A workpiece handling device of claim 2 wherein said feeding means further comprises:
   a carriage slidably mounted on the frame and connected to said second reciprocating means.

6. A workpiece handling device of claim 4 wherein said plate-shaped element has a horizontal flat upper surface, and further including:
   a first support plate mounted adjacent said plate-shaped element on one side thereof and extending between said plate-shaped element and the working stations, said first support plate having a horizontal flat upper surface lying in the plane of said flat horizontal upper surface of said plate-shaped element; and
   a second support plate mounted adjacent said plate-shaped element on the said thereof opposite said first support plate, said second support plate having a flat horizontal upper surface lying in the same plane as said flat horizontal upper surface of said plate-shaped element.

7. A workpiece handling device of claim 6 wherein said first and second support plates each further include:
   a number of pairs of guide bar means equal to the number of working stations and second axes for guiding workpiece holders in the direction of said axis or axes.

8. A workpiece handling device of claim 2 wherein said driving plates and said transfer plates are disposed respectively on said feeding means and said transfer means such that said driving plates and said transfer plates do not engage each other when said feeding means or said transfer means move in relation to each other.

9. The workpiece handling device of claim 8 further including:
   workpiece holding devices each comprising a right parallelepiped having first and second pairs of opposite parallel outer surfaces;
   said first pair of opposite parallel outer surfaces being engaged by said transfer means; and said second pair of opposite parallel outer surfaces being engaged by said feeding means.

10. A workpiece handling device of claim 9 wherein:
    each one of said plurality of pairs of transfer plates comprise first and second transfer plates having a cross section narrower than each of said first pair of opposite parallel outer surfaces of said workpiece holding devices; and
    each one of said plurality of pairs of driving plates comprise first and second driving plates having a cross section narrower than each of said second pair of opposite parallel outer surfaces of said workpiece holding devices.

11. A workpiece handling device of claim 8 wherein said plurality of first engaging means extend vertically upward from said transfer means and said plurality of said second engaging means extend vertically downward from said feeding means; and
    the total of the upward extension of said plurality of said first engaging means and of the downward extension of said second engaging means is less than the vertical distance between said transfer means and said feeding means.

12. A workpiece handling device in accordance with claim 1 in which there are a predetermined number greater than one of different sequential working positions, wherein said transfer means has one more first engaging means than said predetermined number of working positions.

13. A workpiece handling device in accordance with claim 1 having a predetermined number greater than one of identical working stations, wherein said transfer means has twice as many first engaging means as working stations.

14. A workpiece handling device in accordance with claim 1 further including control means for controlling the operation of said first and second reciprocating means such that the workpiece handling device operates cyclically and a cycle consists of moving said first reciprocating means in a first direction along said first axis, thereafter moving said second reciprocating means in a first direction along said second axis, thereafter moving said first reciprocating means in a second direction along said first axis, and thereafter moving said second reciprocating means in a second direction along said second axis.

* * * * *